US010761010B2

(12) United States Patent
Goergen et al.

(10) Patent No.: US 10,761,010 B2
(45) Date of Patent: Sep. 1, 2020

(54) METHOD AND APPARATUS FOR MONITORING A CORROSIVE ENVIRONMENT FOR ELECTRICAL EQUIPMENT

(71) Applicant: CISCO TECHNOLOGY, INC., San Jose, CA (US)

(72) Inventors: Joel Goergen, Soulsbyville, CA (US); Robert Gregory Twiss, Chapel Hill, NC (US); Elizabeth Kochuparambil, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 664 days.

(21) Appl. No.: 15/230,031

(22) Filed: Aug. 5, 2016

(65) Prior Publication Data

US 2018/0038785 A1    Feb. 8, 2018

(51) Int. Cl.
*G01N 17/04*    (2006.01)

(52) U.S. Cl.
CPC .................................. *G01N 17/04* (2013.01)

(58) Field of Classification Search
CPC ....................................................... G01N 17/04
See application file for complete search history.

(56) References Cited

U.S. PATENT DOCUMENTS

| 7,313,947 | B2* | 1/2008 | Harris | G01N 17/006 |
| | | | | 324/71.2 |
| 2011/0206381 | A1* | 8/2011 | Ji | H04B 10/801 |
| | | | | 398/140 |
| 2014/0225603 | A1* | 8/2014 | Auguste | G01R 21/00 |
| | | | | 324/244 |
| 2016/0084771 | A1* | 3/2016 | Chen | G01N 21/25 |
| | | | | 436/119 |
| 2017/0160237 | A1* | 6/2017 | Freer | G01N 27/9073 |

FOREIGN PATENT DOCUMENTS

CN             204789559 U       11/2015

* cited by examiner

*Primary Examiner* — Jay Patidar
(74) *Attorney, Agent, or Firm* — Cindy Kaplan

(57) ABSTRACT

According to one aspect, an apparatus includes a first printed circuit board (PCB), the first PCB including a first interface, and a corrosion sensor assembly. The corrosion sensor assembly including a second interface arranged to be coupled to the first interface, the corrosion sensor assembly further including a signal trace field and a plurality of components, wherein the signal trace field and the plurality of components are arranged to provide an indication of whether the apparatus is in an environment that is corrosive.

9 Claims, 7 Drawing Sheets

METHOD AND APPARATUS FOR MONITORING A CORROSIVE ENVIRONMENT FOR ELECTRICAL EQUIPMENT

TECHNICAL FIELD

The disclosure relates generally to monitoring environments in which electrical equipment is used or otherwise placed. More particularly, the disclosure relates to a sensor assembly which allows the environment, in which electrical equipment is located, to be monitored determining the presence and/or the severity of a corrosive environment.

BACKGROUND

The environment in which network and telecommunications equipment or, more generally, electrical equipment, is often not conducive to the prolonged operation and life of the equipment. For example, the equipment may be subjected to adverse environmental factors throughout its lifetime. Such adverse environmental factors may include, but are not limited to including, temperature and humidity extremes, airborne particulates, chemical pollutants, and other contaminants.

Adverse environmental factors may lead to equipment performance degradation and a shortened useful life. Metallic corrosion, which is generally an electrochemical reaction that occurs when metals are exposed to electrolytes, may destroy metal over time. An electrolyte may be moisture, as well as other environmental elements. Metallic corrosion may occur in electrical equipment that includes a printed circuit board (PCB). In PCBs, metallic corrosion may cause the destruction of copper traces and, thus, cause degraded and unstable performance of the PCBs. Further, metallic corrosion may reduce the life expectancy of circuits included on the PCBs.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
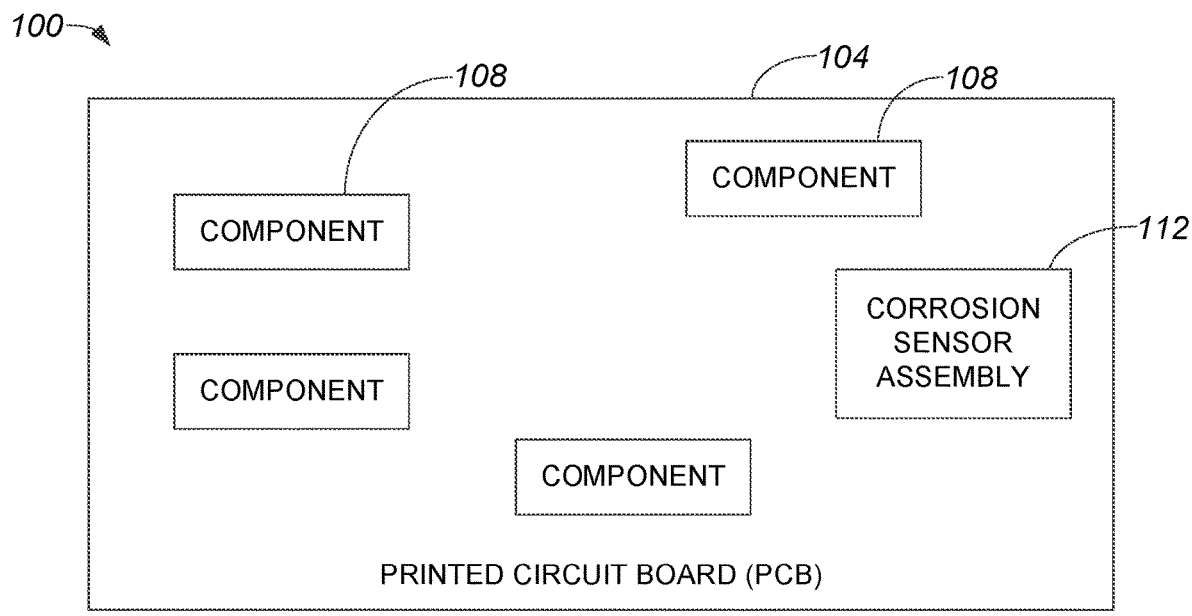
FIG. 1 is a diagrammatic representation of a printed circuit board (PCB) assembly that includes a corrosion sensor assembly in accordance with an embodiment.

In one embodiment, an apparatus includes a first printed circuit board (PCB), the first PCB including a first interface, and a corrosion sensor assembly. The corrosion sensor assembly including a second interface arranged to be coupled to the first interface, the corrosion sensor assembly further including a signal trace field and a plurality of components, wherein the signal trace field and the plurality of components are arranged to provide an indication of whether the apparatus is in an environment that is corrosive, or the potential risk that the apparatus is in due to an environment that is corrosive.

Description

Adverse environmental factors may lead to equipment performance degradation and a shortened useful life. Exposure of printed circuit boards (PCBs) in electrical equipment to corrosive environmental factors such as moisture may cause components of the PCBs, e.g., copper traces, to corrode over time. Metallic corrosion occurs when metals are exposed to electrolytes, e.g., moisture, and when a copper trace is exposed to electrolytes, the performance of the copper trace may degrade and become unstable, thereby reduce the life expectancy of a circuit that include the copper trace.

Corrosion typically occurs relatively slowly. That is, corrosion is often a slow-acting process. Often, the performance degradation associated with a trace on a PCB that is subjected to corrosion will initially be substantially imperceptible, and therefore, corrosion may be difficult to detect and to diagnose. However, if corrosion is not addressed and potentially remediated, corrosion may progress to a point at which a PCB effectively becomes unusable. The worsening of PCB performance, or the worsening of the performance of a circuit on a PCB, may render the PCB to be unusable, and often leads to the failure of the PCB altogether.

In one embodiment, a sensitive and relatively precise method monitors an environment to determine whether equipment, e.g., electrical equipment, is subjected to a corrosive environment and/or to what extent the equipment is subject to the corrosive environment. By positioning a sensor assembly which is configured to detect changes to a sensor PCB which may indicate that traces of the sensor PCB are likely corroding on the sensor PCB, the ability to determine when equipment that includes the sensor PCB is subjected to a corrosive environment may be enhanced. For example, a system operator may track the growth rate of corrosion on a sensor PCB, and intervene as needed. When a system operator has the ability to detect corrosion in equipment when corrosion is just beginning, environmental factors which may be causing the corrosion may be addressed, and remediating actions may be taken. Remediating actions may include, but are not limited to including, removing the affected equipment from the corrosive environment or replacing the affected equipment prior to degraded performance of the equipment occurring and/or causing issues.

A sensor assembly, e.g., a corrosion sensor assembly, may be arranged to be included on a PCB in equipment that is placed in a potentially corrosive environment. Through the use of an onboard processor, sensor changes on the corrosion sensor assembly may be logged, filtered, analyzed, and paired to management software to trigger alarms, as well as to effectively predict system corrosion effects. Such corrosion sensor assemblies may be networked, and data acquired by such corrosion sensor assemblies may be used to enable multi-variable data analytic trends and predictions. As such, corrosion sensor assemblies may be used to ascertain whether a PCB on which the corrosion sensor assembly is mounted is subjected to a corrosive environment.

Referring initially to FIG. 1, a PCB assembly which includes a corrosion sensor assembly will be described in accordance with an embodiment. A PCB assembly 100 includes a PCB 104 that includes at least one component 108. Components 108 may generally include, but are not limited to including, electrical components such as resistors and capacitors, mechanical components such as connectors, integrated circuits (ICs), traces, and the like.

PCB assembly 100 also includes a corrosion sensor assembly 112 that is in communication with PCB 104, e.g., physically mounted on PCB 104 and in electrical communication with PCB 104. It should be appreciated that corrosion sensor assembly 112 may be physically coupled to PCB assembly 110 through any suitable coupling interface, as for example a solder joint, epoxy, or the like. Corrosion sensor assembly 112, which will be described in more detail below with respect to FIG. 3A, generally includes a PCB, a signal trace field, and electrical components which are configured to indicate when corrosion sensor assembly 112 or, more generally, PCB assembly 100, is located in a potentially corrosive environment.

Figure 2:
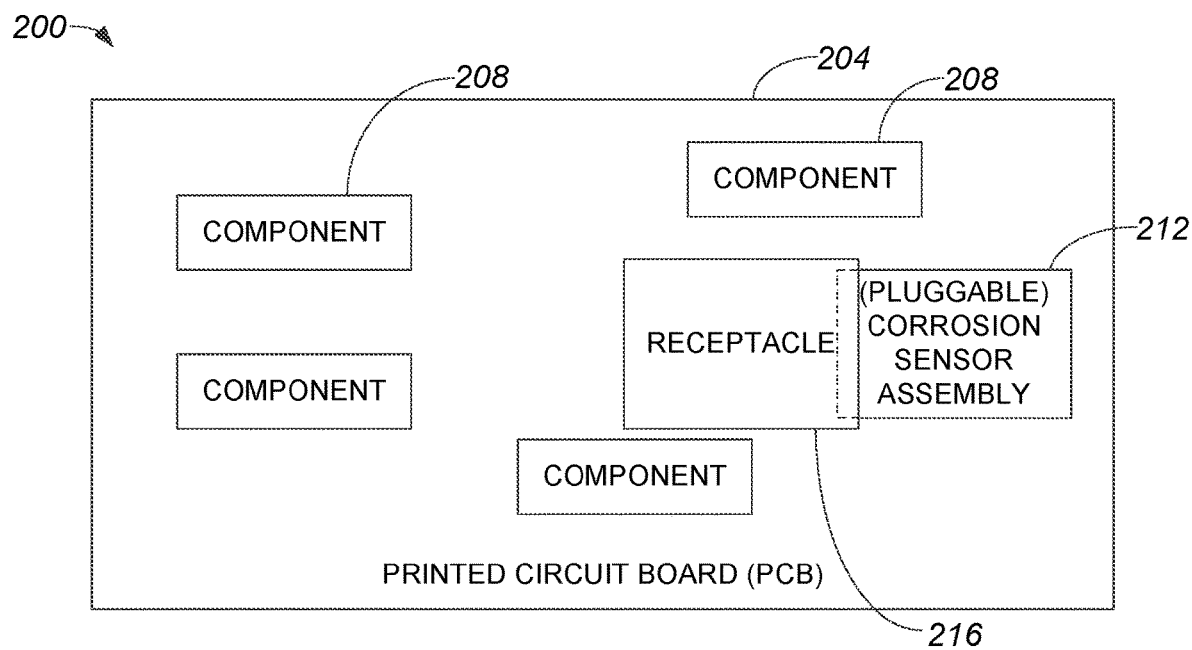
FIG. 2 is a diagrammatic representation of a PCB assembly that includes a pluggable corrosion sensor assembly in accordance with an embodiment.

In one embodiment, a corrosion sensor assembly may be pluggable. That is, a corrosion sensor assembly may be arranged to be readily removed or decoupled from a PCB such that it may efficiently be replaced. FIG. 2 is a diagrammatic representation of a PCB assembly that includes a pluggable corrosion sensor assembly in accordance with an embodiment. A PCB assembly 200 includes a PCB 204 on which components 208 are mounted, and a pluggable corrosion sensor assembly 212. PCB 204 also includes a receptacle 216 with which pluggable corrosion sensor assembly 212 may be coupled, e.g., mounted, or otherwise electro-mechanically coupled. Through the use of receptacle 216, pluggable corrosion sensor assembly 212 may effectively be coupled with, and uncoupled from, PCB 204.

Figure 3A:
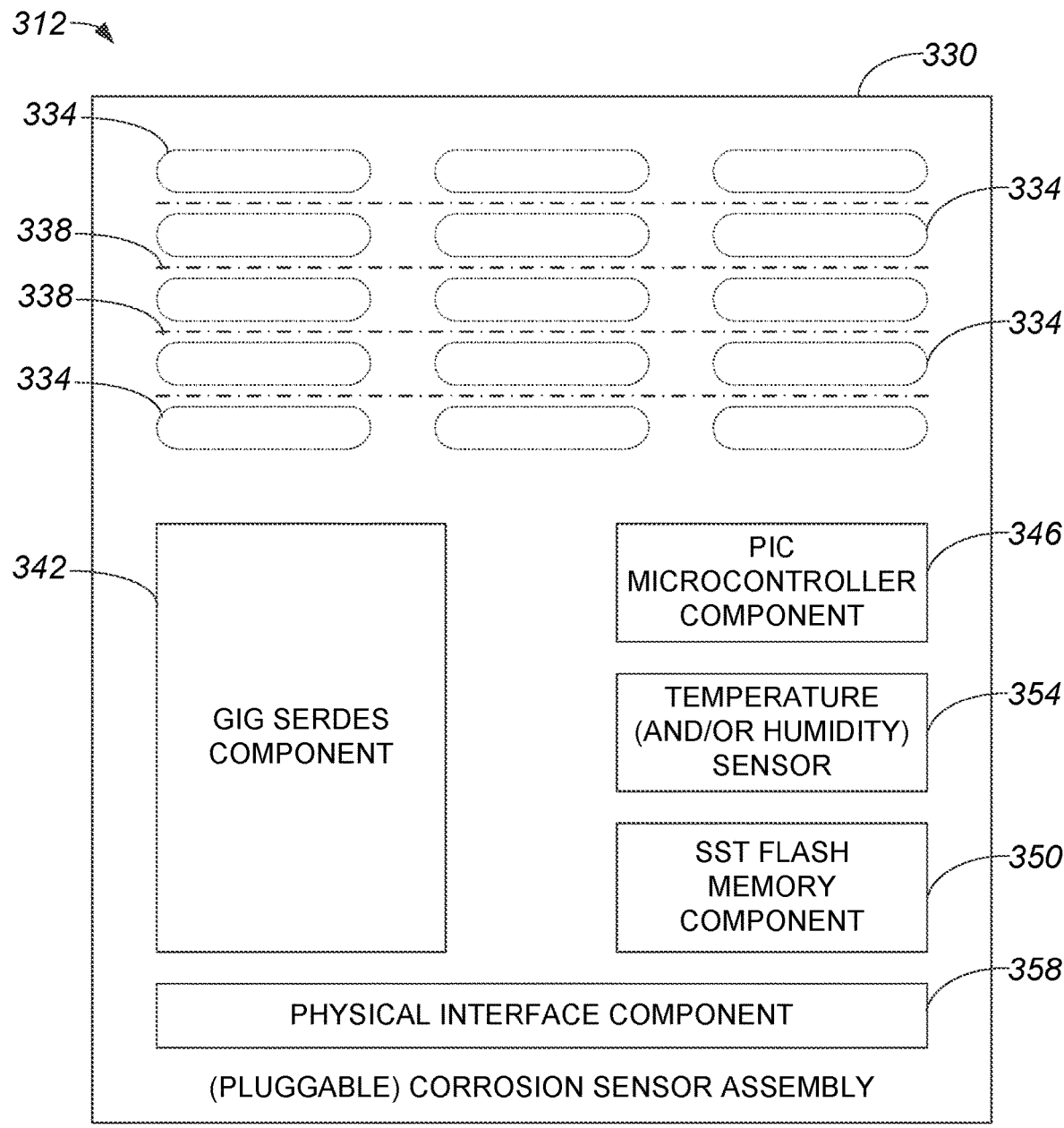
FIG. 3A is a diagrammatic representation of a pluggable corrosion sensor assembly in accordance with an embodiment.
Figure 3B:
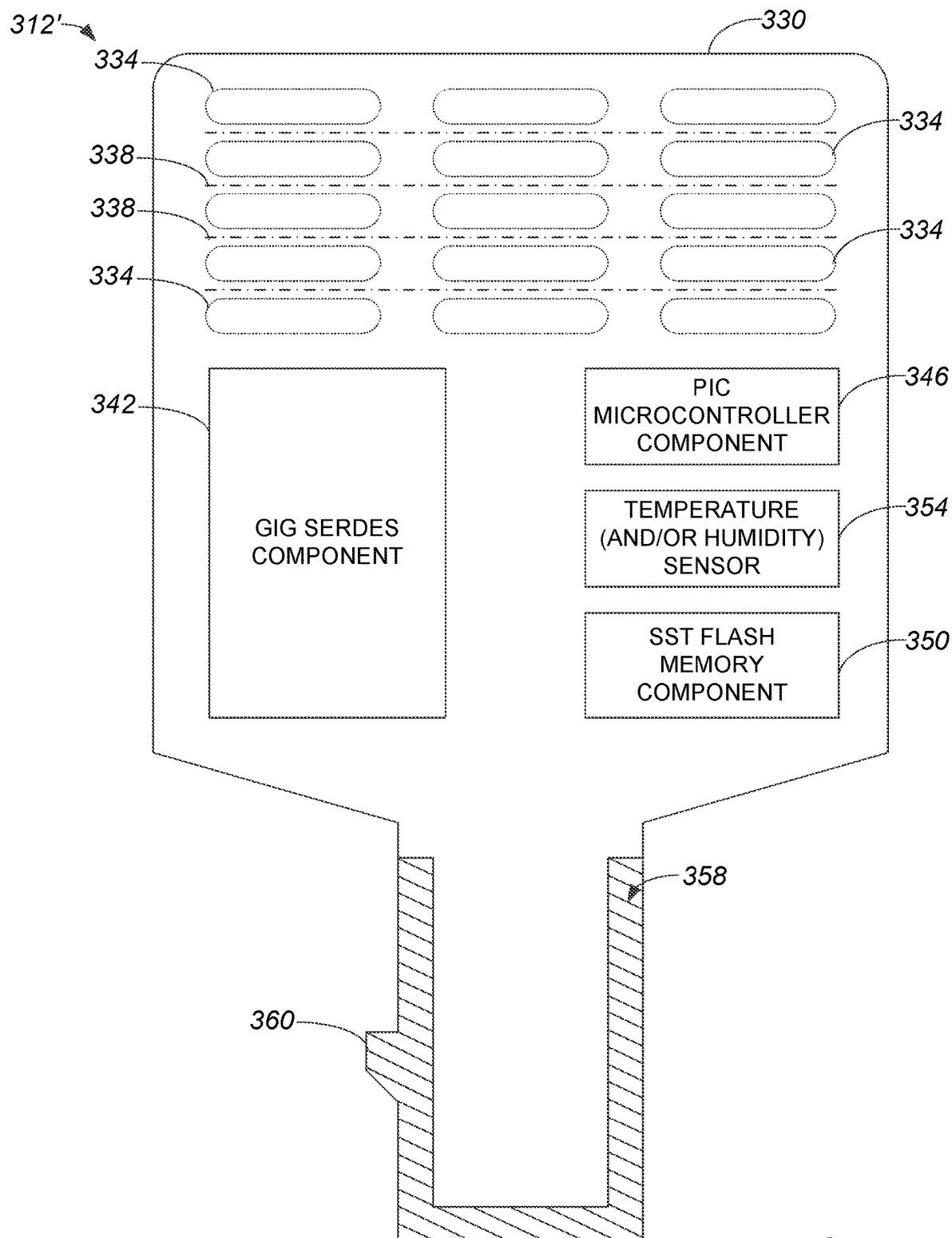
FIG. 3B is a diagrammatic representation of a pluggable corrosion sensor assembly of a first shape in accordance with an embodiment.

With reference to FIGS. 3A and 3B, a pluggable corrosion sensor assembly will be described in accordance with an embodiment. FIG. 3A is a block diagram representation of a corrosion sensor assembly in accordance with an embodiment. A corrosion sensor assembly 312 includes a sensor PCB 330 that includes multiple openings or slots 334 and traces 338, e.g., copper traces. Openings 334 are arranged substantially around traces 338 to allow air to flow through and around traces 334 or, more generally, a field of traces 338. As will be appreciated by those skilled in the art, openings 334 are generally holes or aperture defined within PCB 330.

The field of traces 338 may include any number of traces 338 that effectively span the width of sensor PCB 330. In one embodiment, field of traces 338 includes approximately four traces 338 that are approximately 25 millimeters (mm) in width. Of the four traces 338, two traces 338 may be formed from exposed copper to effectively mimic a typical PCB signal trace configuration, while two traces 338 may be substantially potted to shield those two traces 338 from moisture and other environmental contaminants. In other words, a pair of traces 338 is substantially exposed to the environment, while another pair of traces 338 is substantially shielded from the environment. As will be appreciated by those skilled in the art, potting traces 338 may include using materials such as plastics or silicone rubber gels to substantially insulate traces 338 from moisture, air contaminants, and other corrosive elements. Traces 338 formed from exposed copper may be considered to be a test pair, and potted traces 338 may effectively be a control pair used as a reference to which to compare the test pair. The use of a control pair and a test pair may enable better data verification when signals associated with the control pair and the test pair are compared, as both the control pair and the test pair may be exposed to the same conditions. For example, the control pair and the test pair may be exposed to substantially the same environment in terms of shock, vibration, and/or temperature. By exposing the control pair and the test pair to substantially the same environment, it may generally be easier to narrow the focus on effects of corrosion on the control pair and the test pair, as the test pair may be corroded while the control pair remains substantially corrosion free.

Corrosion sensor assembly 312 also includes a gigabit serializer/deserializer (SerDes) component 342, a PIC microcontroller component 346, a silicon storage technology (SST) flash memory component 350, a temperature and/or humidity sensor 354, and an interface component 358, all of which may be coupled to or otherwise mounted on sensor PCB 330. In one embodiment, corrosion sensor assembly 312 may include a battery component (not shown), e.g., a rechargeable battery, which allows corrosion sensor assembly 312 to continue to operate in the event that the PCB to which corrosion sensor assembly is interfaced suffers from a loss of power.

Gigabit SerDes component 342 enables communication between corrosion sensor assembly 312 and external management and monitoring logic, as for example, software and/or hardware logic. Gigabit SerDes component 342 may provide data to external management and monitoring logic, or a management arrangement, such that the external management and monitoring logic may determine when to provide an alert, as for example to a system operator, that corrosion sensor assembly 312 is in a corrosive environment.

PIC microcontroller component 346 is generally a controller which is configured to control the operation of corrosion sensor assembly 312. In one embodiment, PIC microcontroller component 346 performs tasks including, but not limited to, identifying data logging intervals and obtaining the data, signal performance analysis, data analysis, and communications. In other words, PIC microcontroller component 346 may log changes in signal integrity, and cause the changes to be analyzed, as for example using multi-variable data analytic trends and predictions, to determine whether corrosion is likely occurring. PIC microcontroller component 346 effectively interacts with trace pairs in field of traces 338, and derives data from quality and characteristics of the signals flowing through the trace pairs. It should be appreciated that Gigabit SerDes component 342 may generally interact with field of traces 338 to monitor changes, and pass information with respect to the changes to PIC microcontroller component 346.

SST flash memory component 350 is generally configured to store obtained data. For example, SST flash memory component 350 stores non-volatile data logged by corrosion sensor assembly 312 for substantially real-time processing, and enables the logged non-volatile data to be retrieved. It should be appreciated that the retrieval of the non-volatile data from SST flash memory component 350 may be performed substantially asynchronously. In addition, SST flash memory component 350 may also store externally derived data such as whether a host PCB has experienced a power loss.

Temperature and/or humidity sensor 354 is arranged to obtain local environmental data, and to provide the local environmental data for storage in SST flash memory component 350 and analysis by PIC microcontroller component 346. It should be appreciated that additional sensors, e.g., a shock and vibration sensor, may also be included in pluggable corrosion sensor assembly 312.

Pluggable corrosion sensor assembly 312 may generally be of any suitable size and shape. The size and shape of pluggable corrosion sensor assembly 312 may be selected based on the requirements of an overall system of which pluggable corrosion sensor assembly 312 is a part. It should be appreciated that, in general, components fixed to PCB 330 may also be protected from moisture and environmental degradation using potting techniques similar to those employed on control trace pairs, as mentioned above. FIG. 3B is a diagrammatic representation of pluggable corrosion sensor assembly 312 in which pluggable corrosion sensor assembly 312 has a first shape in accordance with an embodiment. A pluggable corrosion sensor assembly 312 may be formed from PCB 330, which may be of any suitable thickness, e.g., a thickness of approximately 0.04 inches (in). As shown, traces 338 and openings 334 are located on PCB 330 near an end of PCB 330. In the embodiment as shown, physical interface component 358 includes a latch feature 360 arranged to allow physical interface component 358 to securely interface with a physical interface of a host system PCB (not shown). Physical interface component 358 may be plated in metal to allow for electrical connectivity with a physical interface of a host system PCB.

Figure 4:
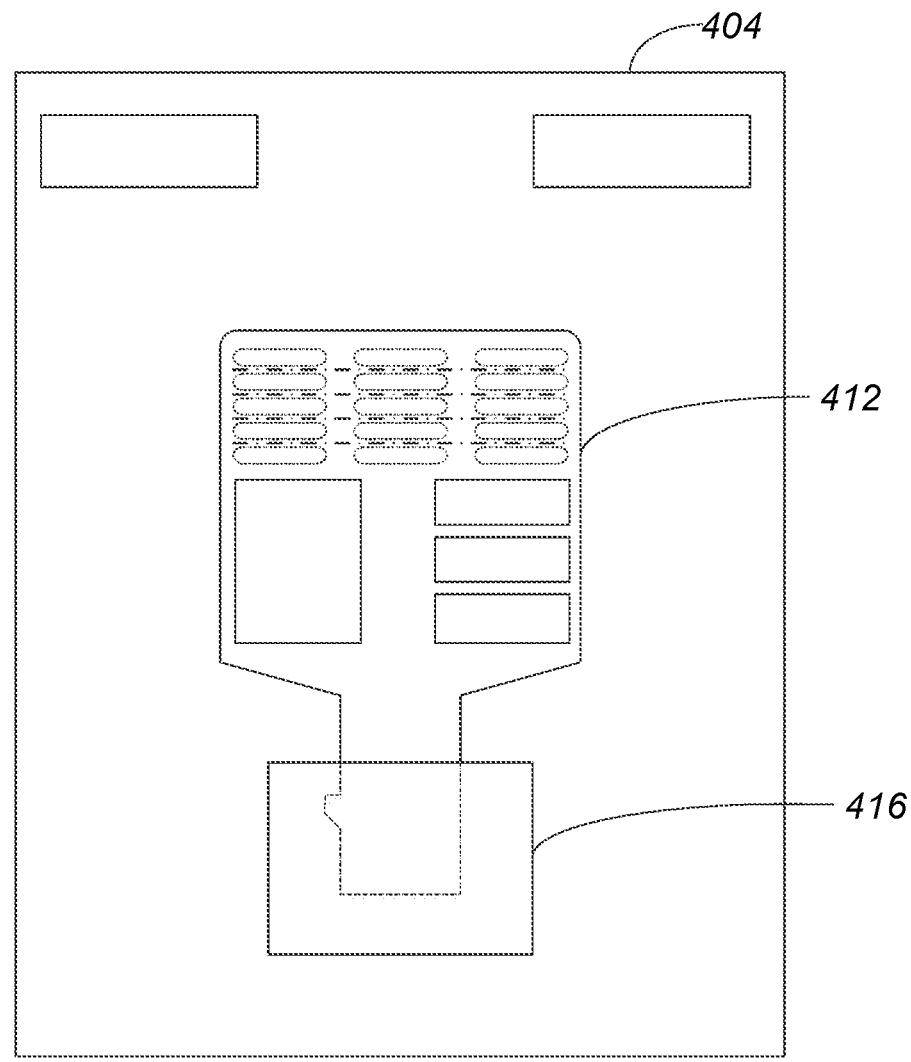
FIG. 4 is a diagrammatic representation of a PCB assembly that includes a pluggable corrosion sensor assembly of a first shape in accordance with an embodiment.

Referring next to FIG. 4, a PCB assembly that includes a pluggable corrosion sensor assembly of a first shape, as shown in FIG. 3B, will be described in accordance with an embodiment. A PCB assembly 400 includes a main PCB 404, as for example a motherboard or a host system PCB, and a pluggable corrosion sensor assembly 412. In general, PCB 404 includes components such as a connector 416, and may either have an onboard power source or may be connected to an external power source (not shown). Connector 416 may be any suitable connector. By way of example, connector 416 may be a MicroSD connector.

In the described embodiment, connector 416 is configured to receive, or to engage with or connect to, at least a portion of pluggable corrosion sensor assembly 412 such that pluggable corrosion sensor assembly 412 is effectively mounted substantially parallel to PCB 404, or substantially along the same plane as PCB 404. As shown, connector 416 may be a receptacle configured to interface with or to engage with a physical interface component, e.g., a connector, of pluggable corrosion sensor assembly 412. That is, connector 416 is generally arranged to connect with pluggable corrosion sensor assembly 412 to provide a mechanical and/or electrical connection between PCB 404 and pluggable corrosion sensor assembly 412. Typically, at least a portion of pluggable corrosion sensor assembly 412 is arranged to be inserted into connector 416 such that pluggable corrosion sensor assembly 412 is removably coupled to connector 416. Connector 416 may include retention components configured to interface with a latch feature or a protrusion included on pluggable corrosion sensor assembly 412. To reduce the likelihood of corrosion on connector 416, connector may include gold contacts arranged to engage pluggable corrosion sensor assembly 412.

Figure 5:
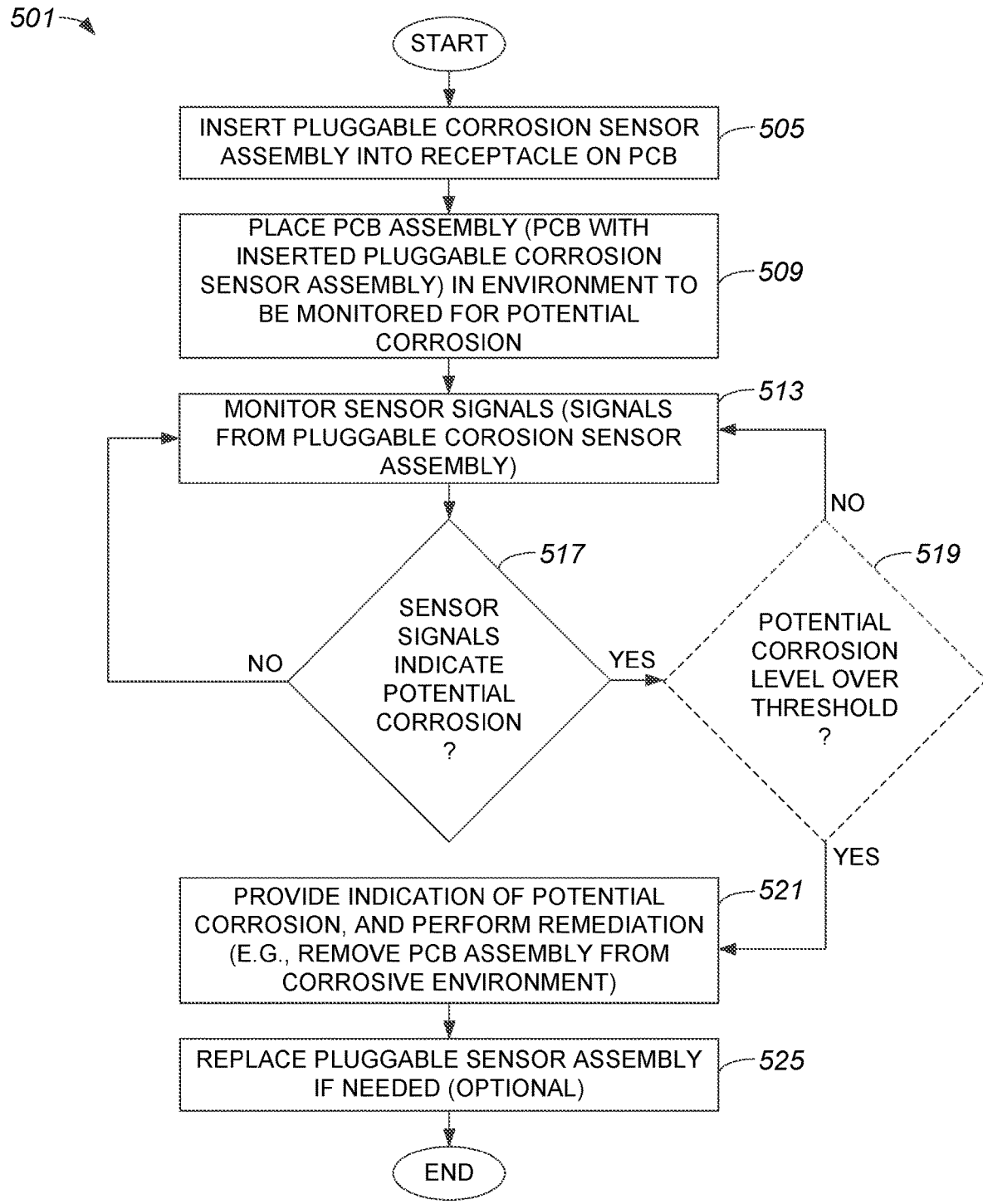
FIG. 5 is a process flow diagram which illustrates one method of using a pluggable corrosion sensor assembly in accordance with an embodiment.

FIG. 5 is a process flow diagram which illustrates one method of using a pluggable corrosion sensor assembly in accordance with an embodiment. A method 501 of using a pluggable corrosion sensor assembly begins at step 505 in which a pluggable corrosion sensor assembly is inserted into a receptacle on a PCB. In one embodiment, inserting the pluggable sensor assembly into a receptacle on the PCB includes electromechanically coupling the pluggable sensor assembly with the PCB.

In step 509, the PCB assembly, i.e., the PCB with the pluggable corrosion sensor, is placed in the environment to be monitored for potential corrosion. That is, the equipment of which the PCB assembly is a part is placed in the environment to be monitored for potential corrosion. It should be appreciated that placing the PCB assembly in the environment to be monitored may generally include positioning the PCB assembly within the equipment. Sensor signals coming from the PCB assembly or, more specifically, from the pluggable corrosion sensor assembly are monitored in step 513. Monitoring sensor signals coming from the pluggable corrosion sensor assembly may include, but is not limited to including, logging changes in the sensor signals, filtering the changes, and analyzing the changes. The signals monitored may include signals associated with test and control traces, as well as signals associated with a temperature and/or humidity sensor. In one embodiment, the signals may be monitored by a management system which obtains data from the pluggable corrosion sensor assembly.

A determination is made in step 517 as to whether the sensor signals indicate potential corrosion. Such a determination may be based on any suitable analysis. Analysis of test and control trace data may include frequency and time domain comparisons. Monitoring differences or changes in signal quality may be performed through loss signatures or frequency-dependent characteristics. However, other signal integrity artifacts such as, but not limited to, equalization needs of a receiver may be used as indicators of corrosion presence and severity on the test traces. In general, signals associated with a test pair of traces on a corrosion sensor assembly and a control pair of traces on the corrosion sensor assembly may be compared to determine whether there is a relatively significant difference between the signals. When there is a relatively significant difference between the integrity of the signals and/or when the difference between the signals increases over time, a corrosive environment may be indicated. In general, the more drastic the change over time, the more server the environment that the equipment is subjected to. It should be appreciated that factors used to determine whether corrosion is likely indicated may vary widely.

If it is determined that sensor signals do not indicate potential corrosion, process flow returns to step 513 in which sensor signals are monitored. Alternatively, if potential corrosion is indicated in step 517, process flow proceeds to optional step 519 in which it is determined whether the potential corrosion is at a level that warrants remediation. That is, in one embodiment, it is determined in step 519 whether a level of potential corrosion is over a threshold, e.g., a threshold over which remediation is performed. If it is determined that potential corrosion is not at a level that warrants remediation, then process flow returns to step 513 in which sensor signals are monitored. Alternatively, if it is determined in step 519 that the potential corrosion level is over a threshold, process flow moves to step 521 in which a notification of potential corrosion may be provided, and remediation may be performed. In other words, when potential corrosion is indicated, a system operator may take actions to effectively ensure that the PCB assembly is no longer subjected to the corrosive environment upon receiving an indication of the potential corrosion. For example, the environment itself may be changed to reduce humidity, and/or the PCB assembly may be removed from the corrosive environment. In one embodiment, an indication of potential corrosion may be provided to a system operator in a notification from a management system, e.g., logic or software, which obtains information from the pluggable corrosion sensor assembly. It should be appreciated that if optional step 519 is not performed, when sensor signals indicate potential corrosion, process flow may proceed from step 517 substantially directly to step 512.

Once remediation is performed in step 521, the pluggable corrosion sensor assembly may be optionally replaced in the PCB assembly. Replacing the pluggable corrosion sensor assembly with a substantially new pluggable corrosion sensor assembly facilitates the continuing monitoring of the PCB assembly for potential corrosion. After the pluggable corrosion sensor assembly is optionally replaced, the method of using a pluggable corrosion sensor assembly is completed.

Figure 6:
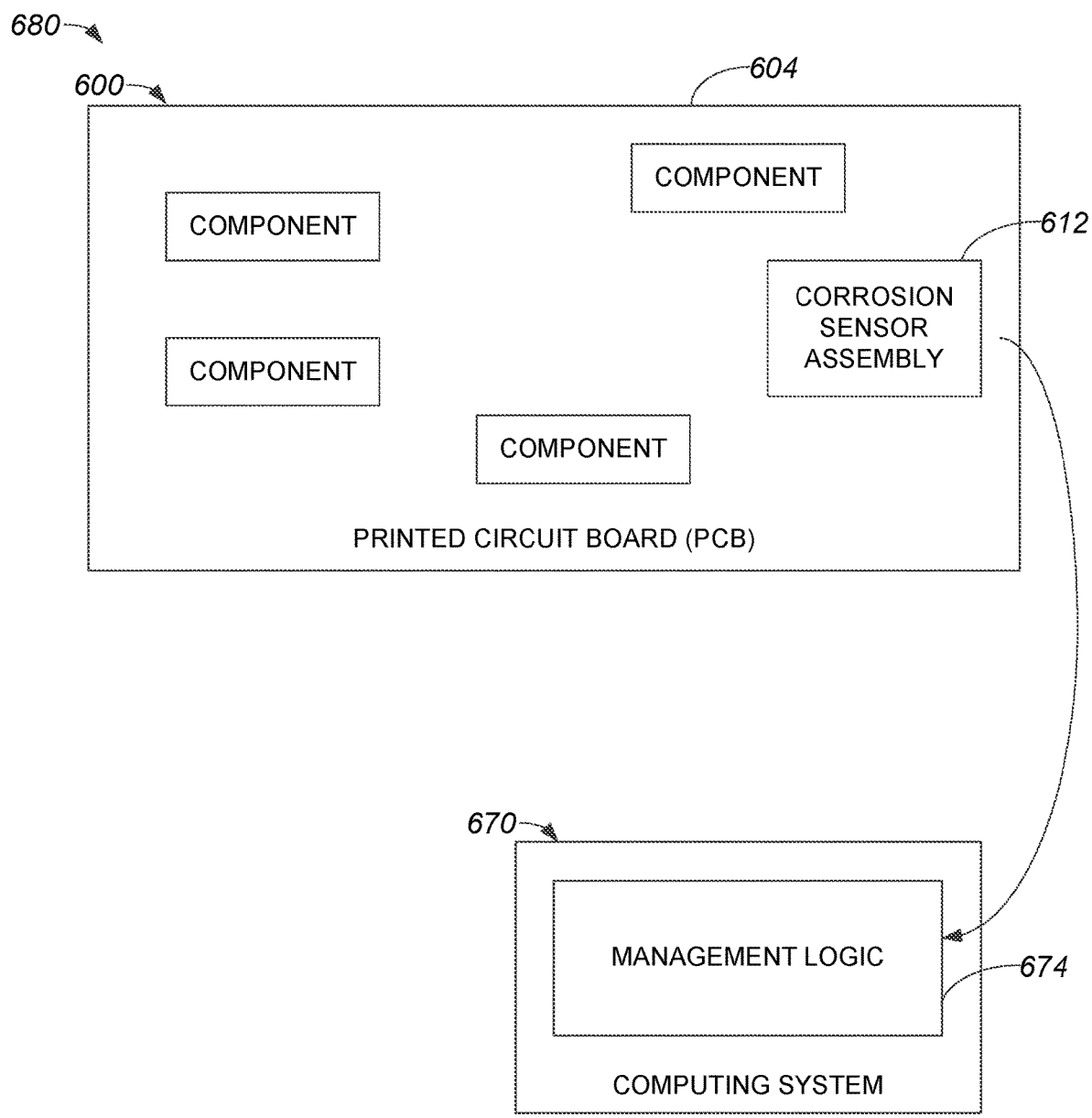
FIG. 6 is a diagrammatic representation of an overall system that includes a corrosion sensor assembly and a computing system configured to process data obtained by the corrosion sensor assembly in accordance with an embodiment.

A corrosion sensor assembly may generally be configured to determine whether the corrosion sensor assembly is in a potentially corrosive environment. In one embodiment, a corrosion sensor assembly may provide data to external management software, and the external management software may use the data to determine whether the corrosion sensor assembly is in a potentially corrosive environment and/or to effectively provide a notification, as for example to a host operator, that the corrosion sensor assembly has detected potential corrosion. FIG. 6 is a diagrammatic representation of an overall system that includes a corrosion sensor assembly and a computing system configured to process data obtained by the corrosion sensor assembly in accordance with an embodiment. An overall system 680 includes a PCB assembly 600 and a computing system 670. PCB assembly 600 includes a corrosion sensor assembly 612 that is arranged to provide data obtained by corrosion sensor assembly 612 to computing system 670. Management hardware and/or software logic 674 executing on computing system 670 may process the data obtained from corrosion sensor assembly 612 to provide a notification that PCB assembly 600 is potentially located in a corrosive environment. Management logic 674 may trigger alarms if the data obtained from corrosion sensor assembly 612 meets certain conditions, and may also be arranged to substantially predict the effect of corrosion on PCB assembly 600. In addition to implementing operator alarms, management logic 674 may also be used to monitor temporal corrosion data to create track corrosion presence and severity over time, and to correlate data from multiple sensors to establish wider contextual information surrounding potential corrosion events.

Overall system 680 may combine and correlate corrosion sensor data with temperature and humidity information from other site sensors. Further, system 680 may be used to assemble corrosion sensor data from multiple location, allowing system operators to discern spatial patterns, e.g., in a data center installation.

Although only a few embodiments have been described in this disclosure, it should be understood that the disclosure may be embodied in many other specific forms without departing from the spirit or the scope of the present disclosure. By way of example, electrical components of a pluggable corrosion sensor assembly including, but not limited to including, a gigabit SerDes component, a microcontroller component, a sensor, and a flash memory component may be potted to protect the components from environmental damage.

A corrosion sensor assembly has been described as being arranged to process data to provide an indication of whether the corrosion sensor assembly is in a corrosive environment. In one embodiment, the corrosion sensor assembly may collect data, but rather than processing the data, the corrosion sensor assembly may provide the data to management logic executing on an external computing system, and the management logic may process the data to determine whether the corrosion sensor assembly is in a corrosive environment.

The components included in a pluggable corrosion sensor assembly may vary. For instance, while a pluggable corrosion sensor assembly has been described as including a PIC microcontroller and an SST flash memory, it should be understood that in lieu of a PIC microcontroller and/or an SST flash memory, any suitable microcontroller or processor and/or any suitable flash memory may be included on a pluggable corrosion sensor assembly.

A pluggable corrosion sensor assembly has been described as including a physical interface component which allows the pluggable corrosion sensor assembly to be electrically and mechanically interfaced with a PCB, i.e., a PCB that is effectively to be monitored for the effects of corrosion. While a microSD connector has been described as being a suitable physical interface component, it should be appreciated that a suitable physical interface component for use to couple a pluggable corrosion sensor assembly to a PCB may vary widely without departing from the spirit or the scope of the present disclosure.

In general, a pluggable corrosion sensor assembly has been described as being positioned on a PCB. While a pluggable corrosion sensor assembly has generally been shown as being oriented along the same plane as a PCB, e.g., such that the pluggable corrosion sensor assembly is substantially parallel to the PCB, the orientation of the pluggable corrosion sensor assembly with respect to the PCB may vary widely. For example, a pluggable corrosion sensor assembly may be interfaced with a PCB such that the pluggable corrosion sensor assembly is effectively in a substantially perpendicular orientation with respect to the PCB.

In one embodiment, a corrosion sensor assembly may be located in the vicinity of a PCB or piece of electrical equipment that is to be monitored for corrosion. That is, in lieu of being located on a PCB or in a piece of electrical equipment that is to be monitored, a corrosion sensor assembly may instead be located in relatively close proximity to the PCB or the piece of electrical equipment. For example, a corrosion sensor assembly may be affixed outside of an electrical equipment enclosure, such as on a data rack.

The shape of a pluggable corrosion sensor assembly may vary widely. It should be appreciated that the shape of the pluggable corrosion sensor assembly as shown in FIGS. 3A and 4 is for purposes of illustration, and various other shapes are possible. In addition, the location of traces, openings, and/or components on the pluggable corrosion sensor may vary widely.

A PIC microcontroller may be equipped with analog to digital, and digital to analog, conversion capabilities build in. As such, the ability of a PIC microcontroller may be leveraged to send relatively high frequency data directly through trace pairs on a corrosion sensor assembly and to receive that data substantially directly, before decoding the data and comparing the data. That is, a PIC microcontroller may include some of the same capabilities as included in a Gigabit SerDes.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A corrosion sensor assembly comprising:
   a printed circuit board (PCB);
   a first interface for connecting the PCB to a host PCB to provide power to the PCB, said first interface comprising a pluggable connection to the host PCB for electromechanically coupling or decoupling the corrosion sensor assembly to or from the host PCB;
   a plurality of traces formed on the PCB and comprising at least one test trace and at least one control trace; and
   a plurality of components to obtain data from signals flowing through said plurality of traces and identify changes to provide an indication when the host PCB is in an environment that is corrosive, wherein said indication is based on a comparison of the signals flowing through the test trace and the control trace.

2. The corrosion sensor assembly of claim 1 wherein the first interface is part of the PCB and arranged to interface with a connector to electrically couple the PCB to the host PCB.

3. The corrosion sensor assembly of claim 1 wherein the plurality of components are arranged to monitor signal integrity of said at least one control trace and said at least one test trace to determine when the test trace exhibits effects of corrosion, wherein the control trace is shielded from the environment and the test trace is exposed to the environment.

4. The corrosion sensor assembly of claim 3 wherein the PCB further includes a plurality of openings, wherein the plurality of openings are interspersed between said plurality of traces to allow air to flow around said plurality of traces.

5. The corrosion sensor assembly of claim 3 wherein the plurality of components includes a first sensor arranged to obtain data relating to the environment, and a controller arranged to identify changes in signal integrity.

6. The corrosion sensor assembly of claim 5 wherein the plurality of components further includes a communications component which allows communication between the apparatus and an external management arrangement.

7. The corrosion sensor assembly of claim 6 wherein the first sensor is a temperature sensor, the controller is a PIC microcontroller, and the communications component is a gigabit serializer/deserializer (SerDes).

8. The corrosion sensor assembly of claim 6 wherein the first sensor is a humidity sensor, the controller is a PIC microcontroller, and the communications component is a gigabit serializer/deserializer (SerDes).

9. The corrosion sensor assembly of claim 1 wherein said at least one control trace includes a pair of control traces and said at least one test trace includes a pair of test traces.

* * * * *